(12) United States Patent
Cok

(10) Patent No.: US 8,806,332 B2
(45) Date of Patent: Aug. 12, 2014

(54) TEMPLATE OPENING MODIFICATION FOR IMAGE LAYOUT METHOD

(75) Inventor: Ronald S. Cok, Rochester, NY (US)

(73) Assignee: Kodak Alaris Inc., Rochester, NY (US)

( * ) Notice: Subject to any disclaimer, the term of this patent is extended or adjusted under 35 U.S.C. 154(b) by 136 days.

(21) Appl. No.: 12/910,918

(22) Filed: Oct. 25, 2010

(65) Prior Publication Data

US 2012/0102398 A1    Apr. 26, 2012

(51) Int. Cl.
*G06F 17/00* (2006.01)
*G06F 17/21* (2006.01)
*G06F 17/24* (2006.01)
*G06T 3/60* (2006.01)

(52) U.S. Cl.
CPC ............ *G06F 17/212* (2013.01); *G06F 17/248* (2013.01); *G06F 17/211* (2013.01); *G06T 3/60* (2013.01)
USPC ............................. 715/243; 715/252; 715/247

(58) Field of Classification Search
CPC ....... G06T 11/60; G06T 3/40; G06T 2210/22; G06F 17/248; G06F 17/212; H04N 1/3875
USPC ............................ 715/243–253; 358/1.18, 1.2
See application file for complete search history.

(56) References Cited

U.S. PATENT DOCUMENTS

| | | | | |
|---|---|---|---|---|
| 4,871,252 A * | 10/1989 | Beni et al. | | 356/457 |
| 5,963,213 A * | 10/1999 | Guedalia et al. | | 345/427 |
| 6,018,397 A * | 1/2000 | Cloutier et al. | | 358/1.1 |
| 6,826,727 B1 * | 11/2004 | Mohr et al. | | 715/235 |
| 6,904,180 B1 | 6/2005 | Gallagher | | |
| 7,133,050 B2 * | 11/2006 | Schowtka | | 345/620 |
| 7,184,167 B1 * | 2/2007 | Ito et al. | | 358/1.18 |
| 7,634,725 B2 * | 12/2009 | Nishikawa | | 715/243 |
| 7,900,139 B2 * | 3/2011 | Hosotsubo | | 715/247 |
| 2005/0007382 A1 * | 1/2005 | Schowtka | | 345/619 |
| 2005/0071783 A1 * | 3/2005 | Atkins | | 715/851 |
| 2005/0097448 A1 * | 5/2005 | Giannetti et al. | | 715/508 |
| 2006/0028659 A1 * | 2/2006 | Nishikawa | | 358/1.2 |
| 2006/0198555 A1 * | 9/2006 | Hosotsubo | | 382/162 |
| 2007/0055690 A1 * | 3/2007 | Giannetti | | 707/102 |
| 2007/0101251 A1 | 5/2007 | Lee et al. | | |
| 2009/0147297 A1 * | 6/2009 | Stevenson | | 358/1.15 |
| 2010/0180213 A1 * | 7/2010 | Karageorgos et al. | | 715/753 |
| 2010/0211885 A1 * | 8/2010 | Berg et al. | | 715/745 |
| 2010/0309497 A1 * | 12/2010 | Oikawa et al. | | 358/1.9 |

* cited by examiner

*Primary Examiner* — Laurie Ries
*Assistant Examiner* — Benjamin Smith
(74) *Attorney, Agent, or Firm* — Hogan Lovells US LLP

(57) ABSTRACT

A method of making an image product comprising displaying digital images and a template with one or more template openings for display in a GUI. A digital image to be placed in the template opening has an image size that is checked for compatibility with the template opening size. A maximum print or display size is calculated based on a viewing distance for the digital image and on the image size. If the maximum print or display size is different than the selected template opening size, the template opening is modified and centered at the template opening center point. The digital image is then composited into the modified template opening, and the composited template is communicated.

20 Claims, 15 Drawing Sheets

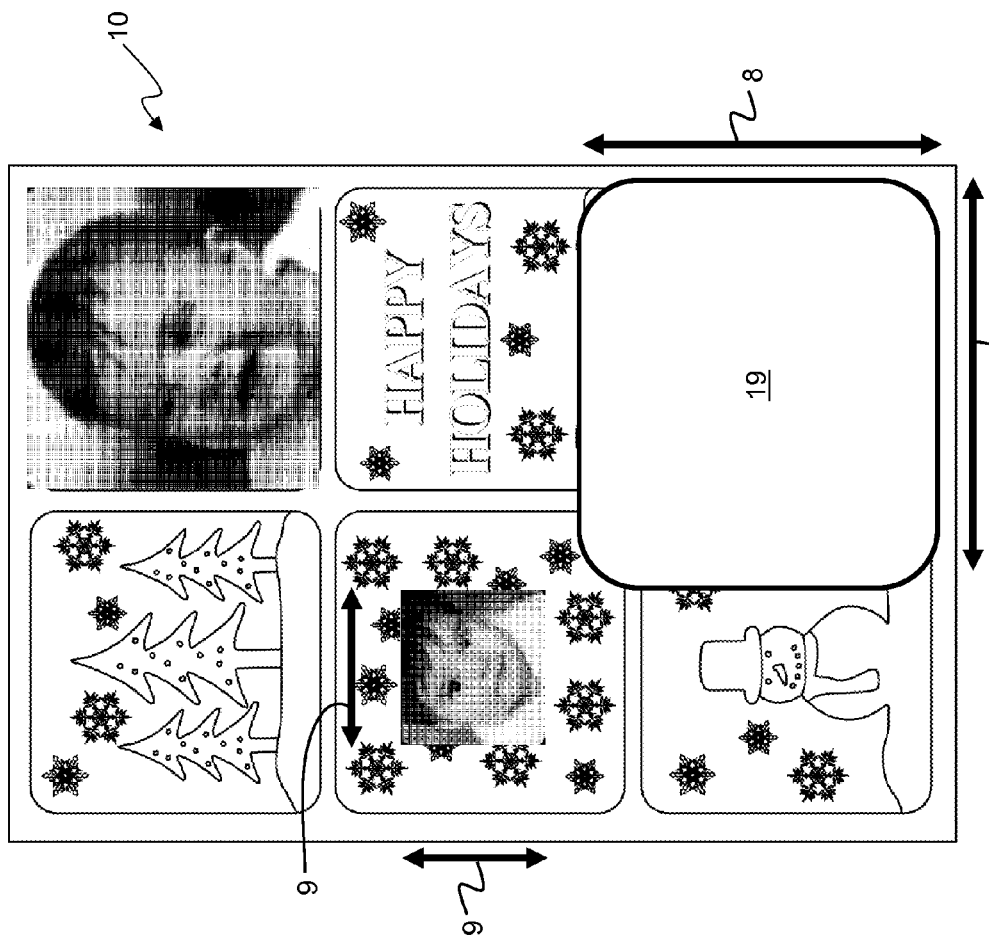

TEMPLATE OPENING MODIFICATION FOR IMAGE LAYOUT METHOD

FIELD OF THE INVENTION

The present invention relates to automatically combining images with image templates to provide an improved aesthetic combination for images and templates of diverse sizes and aspect ratios.

BACKGROUND

Products that include images are a popular keepsake or gift for many people. Such products typically include a picture taken by an individual that is inserted into a product intended to enhance the product, the presentation of the image, or to provide storage for the image. Examples of such products include picture albums, posters, picture calendars, picture mugs, picture ornaments, picture mouse pads, and picture post cards.

Images can also be combined with other images, for example templates including background images and one or more image template openings into which an individual's image can be inserted, either mechanically or electronically with a computer, to form a combined image that displays the individual's image in a pleasing or preferred manner. These image products can be provided in hard-copy form, for example as a printed photo-book, or in electronic form presented by a computer, for example in an on-line album. Imaging products can also include multi-media products, especially when in electronic form, that, for example, can include still images, image groups, image sequences, motion image sequences or audio tracks.

Designing multi-image and multi-media products can be a daunting challenge for users, particularly when the products include personal images. Software tools that execute on computers can assist users in designing customized multi-image products. Such software products can execute, for example, on home computers. Alternatively, on-line design and printing services accessible through an internet browser interface can assist users in designing and printing a multi-image product.

For prior-art products using template designs, for example as employed in commercial on-line image product fulfillment and illustrated in prior-art FIG. 1 for a card, users select digital images to be combined with templates 10. The selected digital images are dragged into a template opening 12 in a graphic user interface. If one of the selected digital images is too small or has a resolution that is too low for the desired template opening, a warning message is provided. If one of the selected digital images is too large for the template opening, the selected digital image is centered in the template opening and automatically cropped. Users can change the cropping to suit their own desires as illustrated in prior-art FIG. 9. The cropped digital image then becomes the desired digital image for compositing into the template location. However, customers desire alternative options that provide a greater degree of flexibility and an improved aesthetic appearance.

There is a need therefore, for an improved method for combining user images with templates within an image product.

SUMMARY OF THE INVENTION

In accordance with the present invention, there is provided a preferred method of making an image product comprising providing a GUI for displaying digital images and digital image templates with one or more template openings for display in the GUI. Each template opening has a template opening size and a template opening center point. A digital image to be placed in the template opening has an image size that is checked for compatibility with the template opening size. A maximum print or display size is calculated based on a viewing distance for the digital image and on the image size. A template opening is selected and is compared with a maximum print or display size. If the maximum print or display size is different than the selected template opening size, the template opening is modified and centered at the template opening center point. The digital image is then composited into the modified template opening, and the composited template is communicated.

Another preferred embodiment of the present invention includes a computer system for making an image product. A computer system GUI displays a user's digital images and digital image templates. One or more template openings has a template opening size and a center point. The computer system includes devices and circuitry for receiving a digital image having an image size, calculating a maximum print or display size based on a desired viewing distance for the digital image, receiving a selection for a template opening, and comparing the maximum print or display size to a size of the template opening and, if the maximum print or display size is different than the template opening size, a modified template opening is formed that is centered at the template opening center point. The user's digital image is composited into the modified template opening, and the composited template is communicated.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 6A illustrates an image template having a larger modified template opening according to an embodiment of the present invention;

FIG. 6B is an image useful in understanding the present invention;

DETAILED DESCRIPTION OF THE INVENTION

According to the present invention, an image product is a product that includes a user's personalized images incorporated into an image-related object, such as for example a photo-book, a picture greeting card, a picture mug, or other image-related product. The images can be positioned in specified pre-determined locations or can be adaptively positioned according to the sizes, aspect ratios, orientations and other attributes of the images. An image product template is a background image having template openings into which user images are to be placed and then composited with the background template to provide an aesthetically appealing combined image that can be rendered, printed, or otherwise communicated, for example by email. In some embodiments of the present invention, the user image sizes, orientations, or aspect ratios are adjusted to accommodate pre-defined templates with specific pre-determined openings.

As used herein, a digital image can include multi-media elements including sound and motion. For example, video sequences, still images, groups of still images, or image sequences all include digital images and can be considered a digital image for the purposes of this invention.

Figure 1:
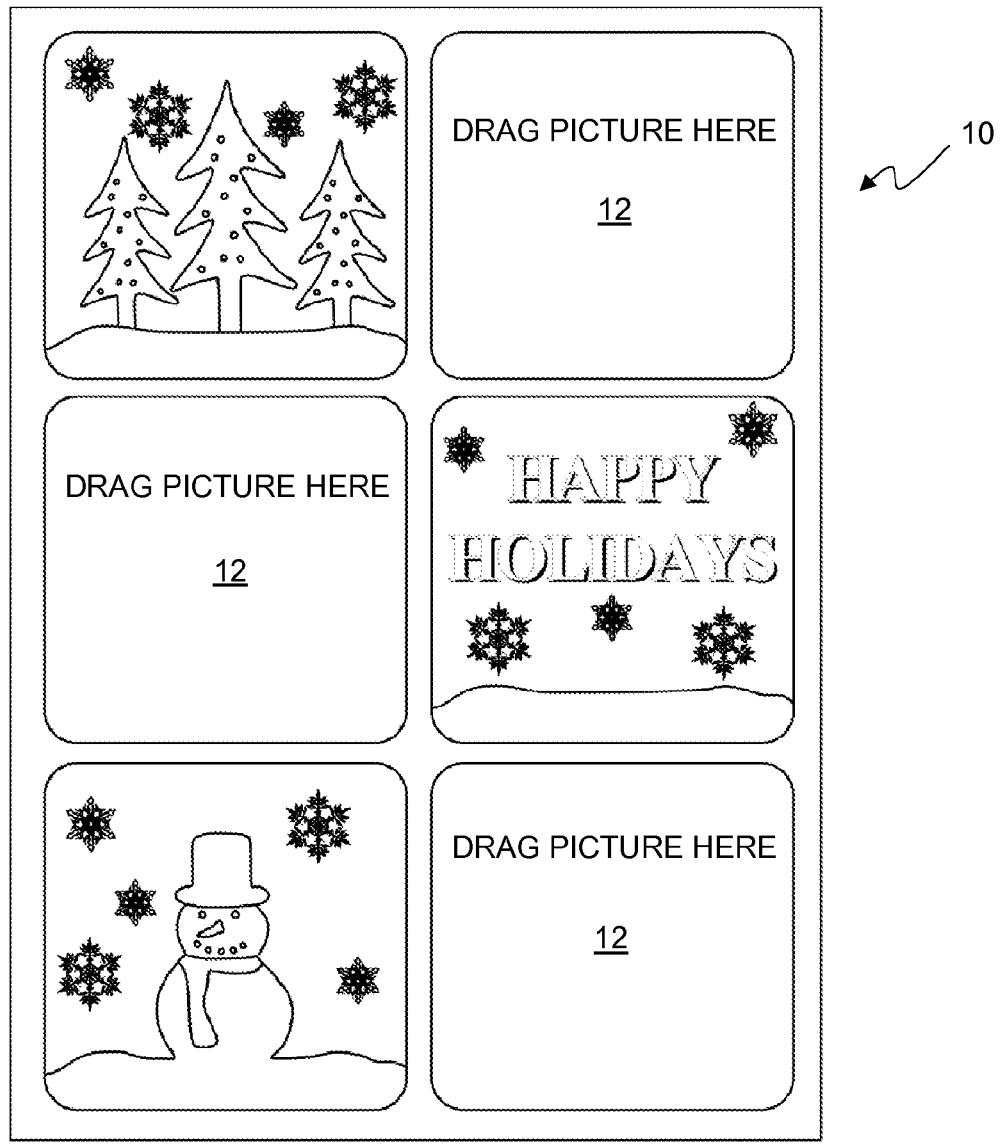
FIG. 1 illustrates a prior-art image template having three template openings for a greeting card.
Figure 2:
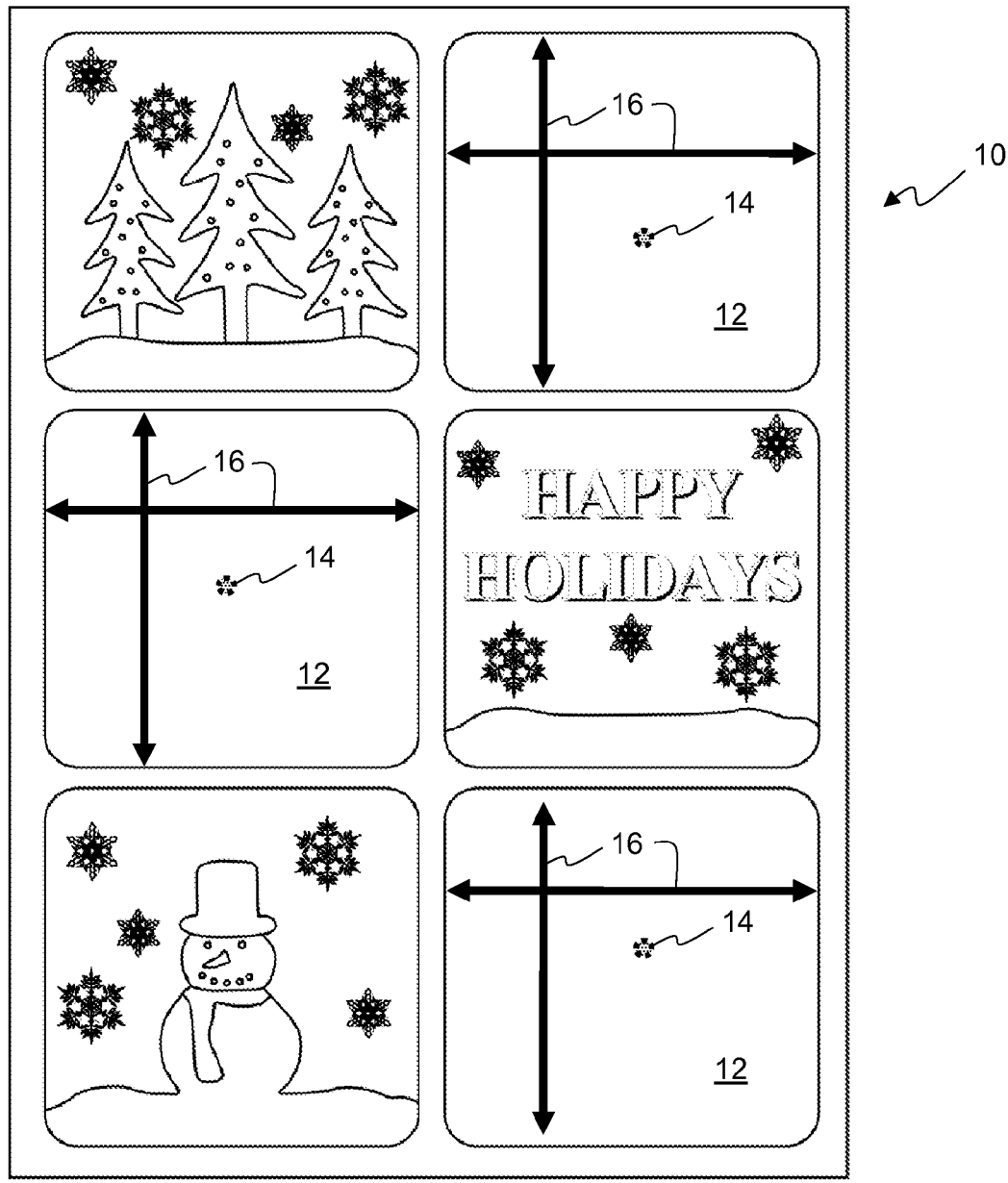
FIG. 2 illustrates an image template having three template openings with centers and sizes useful in an embodiment of the present invention.
Figure 3A:
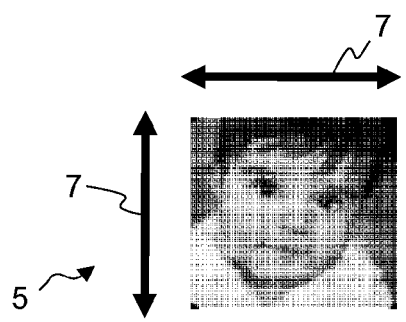
FIGS. 3A-3D are a variety of images useful in understanding the present invention.
Figure 3B:
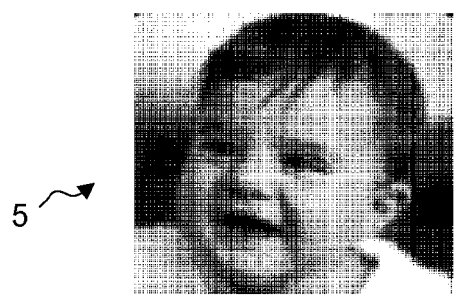
Figure 3C:
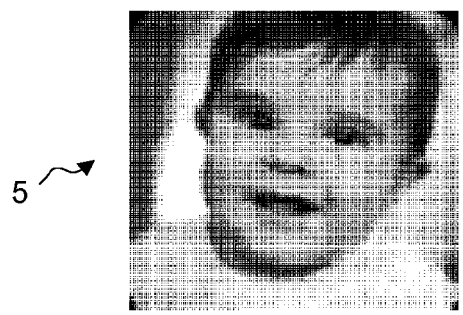
Figure 3D:
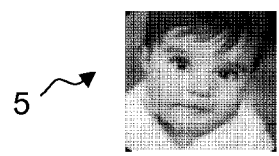
Figure 10:
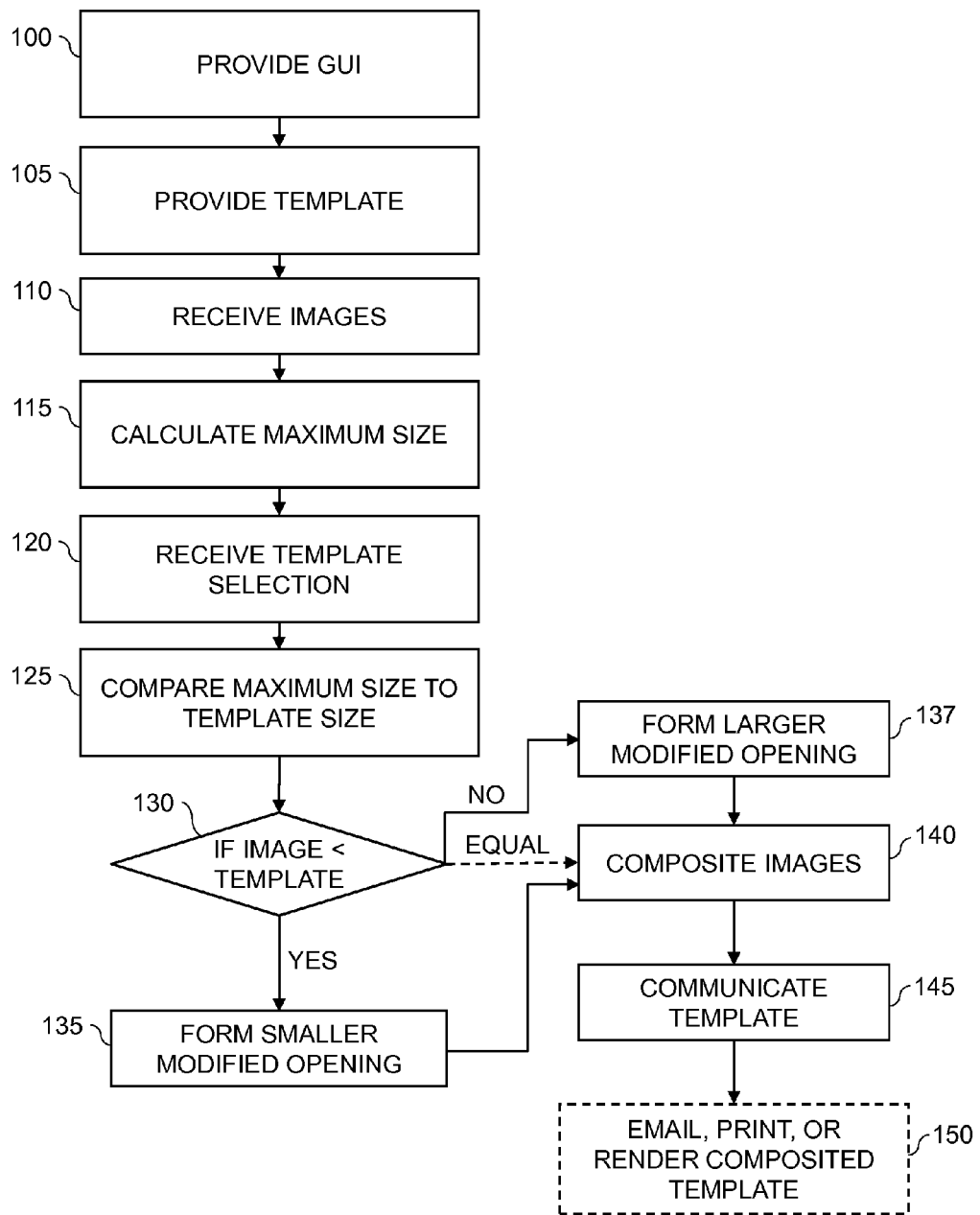
FIG. 10 is a flow graph illustrating a method according to an embodiment of the present invention.

Referring to FIG. 10, in an embodiment of the present invention, a method of making an image product comprises the steps of providing a graphic user interface for displaying digital images and digital image templates in step 100. A template with one or more template openings 12 (for example as illustrated in FIG. 1) is provided in step 105. Each template opening 12 has a template opening size 16 and a template center point 14, as illustrated in FIG. 2. The size is measured in two different, orthogonal dimensions to define an area corresponding to the area of the template opening 12. The template opening 12 can be rectangular or have curved corners (as shown) or curved edges to provide aesthetic appeal. The size 16 is generally taken to be the greatest extent of the opening in a dimension.

Referring to FIGS. 3A, 3B, and 3C, and 3D, a digital image 5 having a digital image size 7 in each of at least two dimensions is received in step 110, for example from a user desiring to make an image product employing the template 10. The digital image 5 can also have a digital image center point (not shown) at the center of the digital image, which is determined by an algorithm that calculates, and stores, midpoint coordinates of each of the vertical and horizontal dimensions. Digital images 5 inherently have a number of pixels in each dimension; the number of pixels per size in each dimension defines the resolution of the digital image 5 (for example pixels per inch). As is well known in the prior art, if the resolution of a digital image is too low, the image appears blurry, grainy, or pixelated and lacks aesthetic appeal. To ensure that a displayed or printed image appears pleasing, a maximum print or display image size that depends on the resolution of the digital image can be calculated in step 115 for the digital image. These can be calculated dynamically or stored in a table of maximum resolutions and dimensions. This maximum image print or display size depends on the intended viewing parameters of the digital images, in particular the viewing distance. The maximum print or display size can be calculated based on viewing distance for the digital image and on the image size. The intended viewing distance depends on the application, for example a handheld communication such as a greeting card or a wall-mounted poster. The smallest maximum image print or display size in any dimension can be the smallest maximum display or print size for the image.

A template opening selection is received in step 120, for example from the user. The maximum print or display size is compared to the template opening size of the selected template opening in step 125. The sizes can be readily compared in pixels or in conventional linear metrics such as inches, centimeters, or millimeters. Since the absolute size of the final product is defined by the template, e.g. for a print, the absolute size of the template opening is readily computed by measuring the relative size of the template openings compared to the overall size of the template. For example, 8.5 by 11 inches, A4, and 5×7 inch standard print sizes are all well known. In the case of a product intended for display, conventional or approximate mean user interface display sizes and viewing distances can be employed.

Figure 4:
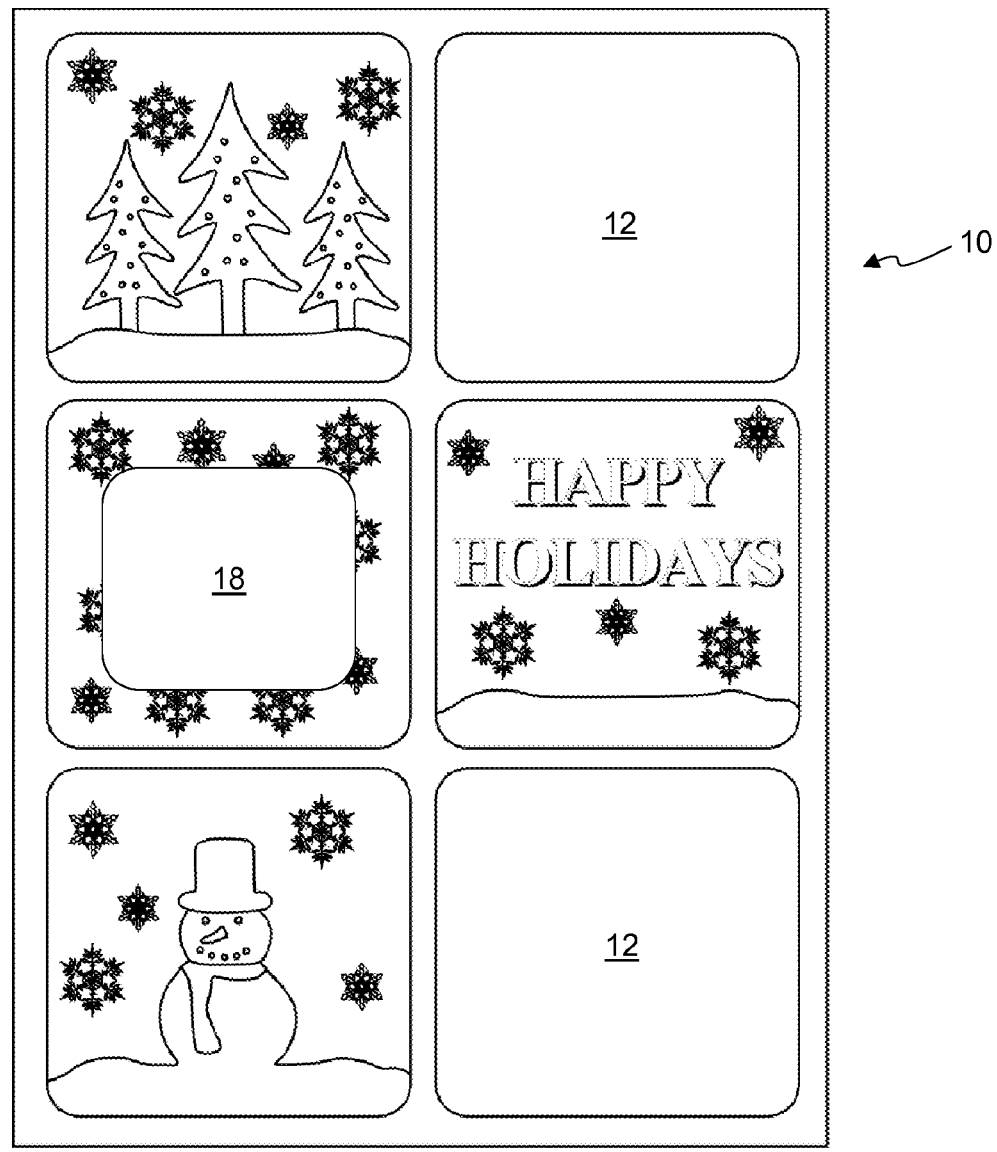
FIG. 4 illustrates an image template having a smaller modified template opening according to an embodiment of the present invention.
Figure 5:
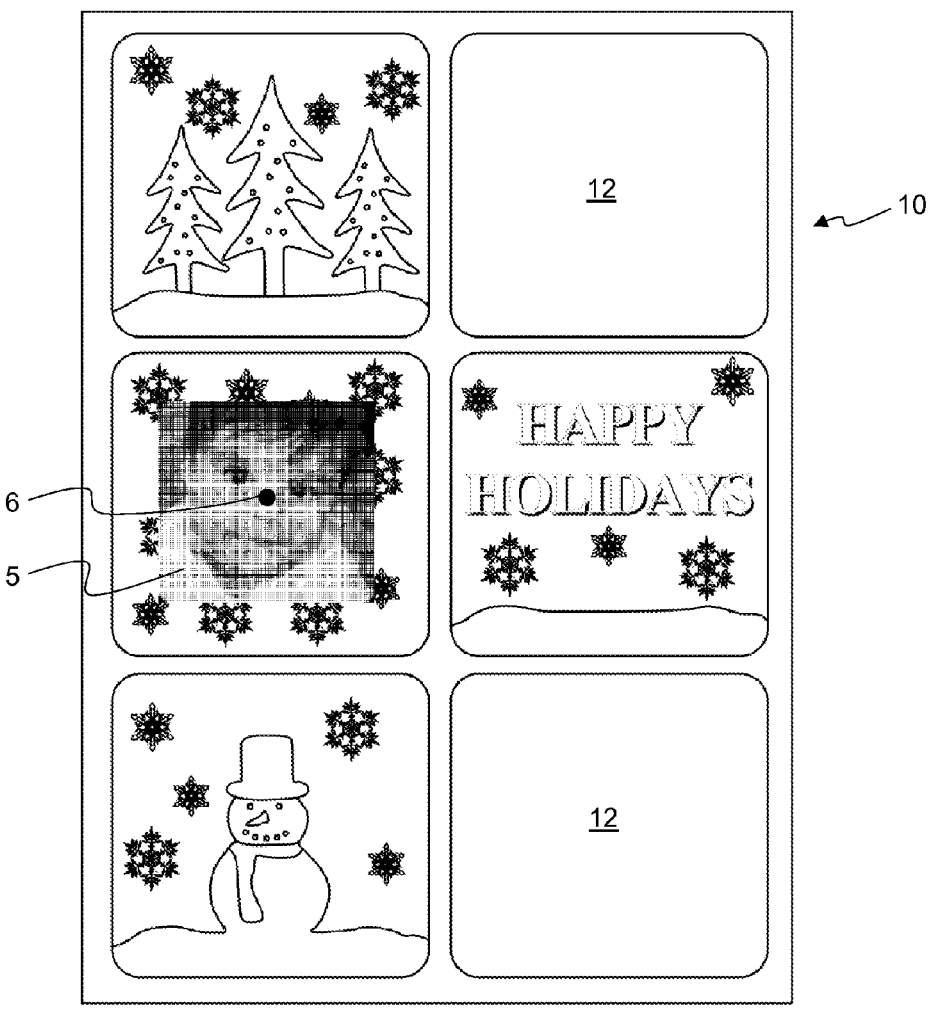
FIG. 5 illustrates an image template having a modified template opening and a composited digital image according to an embodiment of the present invention.

If the maximum print or display size is different than the template opening size 16 of the selected template opening 12 (compared in step 130), a modified template opening 18 centered at the template center point of the selected template opening is formed in either step 135 or step 137 and illustrated in FIG. 4. Referring to FIG. 5, the digital image 5 is composited into the modified template opening in step 140. The above steps can all be done automatically with no intervention required from a user, once the template and digital image(s) are chosen. The composited template can then be communicated in step 145, for example by rendering the composited template to an output device, printing, displaying, transmitting, projecting, or emailing in optional step 150.

In prior-art methods, the modified digital image is sized to match the template opening. In this prior art case, a modified template opening is not formed and the digital image can be composited directly into the opening. To ensure a size match between the digital image and the template opening size, the digital image selected by the user can be processed to form a new, digital image. For example, users can enlarge an image, reduce an image, or crop a portion of a larger image to make an image for use in a template opening. A cropped portion can also be enlarged or reduced in size. As an example, a user might crop a person's face or head from a larger group photo, thereby creating a modified digital image. Regardless of the image processing performed, the digital image provided has a size that is modified and matched to the template opening. If the user performs the image processing manually and the digital image is too small or has too low a resolution do that the maximum display or print size is too small for the template opening, a warning is provided.

In contrast, according to embodiments of the present invention, if a provided digital image, whether cropped, enlarged, or reduced, does not match the template opening a modified template opening is formed.

"If the maximum print or display size of the provided digital image is smaller than the template opening size 16 of the selected template opening 12, a smaller modified template opening having a template opening size matched to the maximum display or print size of the provided digital image is formed in step 135. If the maximum print or display size of the provided digital image is larger than the template opening, the modified template opening is larger than the maximum display or print size of the provided digital image and is formed in step 137. Although the modified template opening is enlarged, it is possible that the digital image is still larger than the enlarged modified template opening. If the digital image is larger than the modified template opening, the digital image can be cropped, enlarged, (FIG. 3B),or reduced (FIG. 3D) to form a digital image that is matched to the modified template opening. A cropping, enlargement, or reduction in size of the digital image can be done automatically. Alternatively, the user can perform the cropping or change in size, or both, to provide a desired digital image. If the maximum print or display size of the provided digital image is equal to the template opening size, the provided digital image can be directly composited (step 140) into the template opening without modifying the template opening."

In one embodiment of the present invention, the cropping is done automatically by using image analysis algorithms known in the art that automatically select a preferred enlargement and cropping for a provided digital image by computing the main subject of the photograph, for example using known face-detection algorithms. This automatically computed digital image can be combined with an automatically selected modified template opening to provide an aesthetic result with a matching provided digital image and modified template opening.

Once the digital image and the modified template openings are made, the digital image can be composited together, in step 140 and communicated in step 145 as discussed above.

"In another embodiment of the present invention, a template location has a maximum template opening size in one or two dimensions. (FIG. 6A reference numberal 8). In one embodiment, the size of a modified template opening is restricted to a size less than or equal to a pre-determined maximum. Since a template opening cannot be larger than the template itself, the maximum template size limits the template opening size. In practice, however, the maximum template opening size is less than the template size since aesthetic considerations are likely to limit the template opening size. Moreover, in a template with multiple template openings, it is desirable to prevent one template opening from encroaching on the space of another template opening. Hence, in an automated system that combines a template opening with a provided digital image, there are limits on digital image and modified template opening size combinations. In an embodiment of the present invention, if the provided digital image is still larger than the modified template opening, the provided digital image size is reduced to a size less than or equal to a stored maximum template opening size of the selected template opening."

Three template openings are shown in the illustrated example templates of FIGS. 1, 2, 4, and 5. Hence, three digital images can be selected and provided, together with the desired corresponding template openings and the process described above completed for each of the three template openings, so that the entire image product, including three different (or the same) digital images are employed, one in each of the three template openings, to form a completed image product. In various templates, various numbers of openings can be provided and are included in the present invention. In a further embodiment of the present invention, a template includes multiple template openings. The process described above for compositing a provided digital image is repeated for each of the multiple template openings.

Figure 6C:
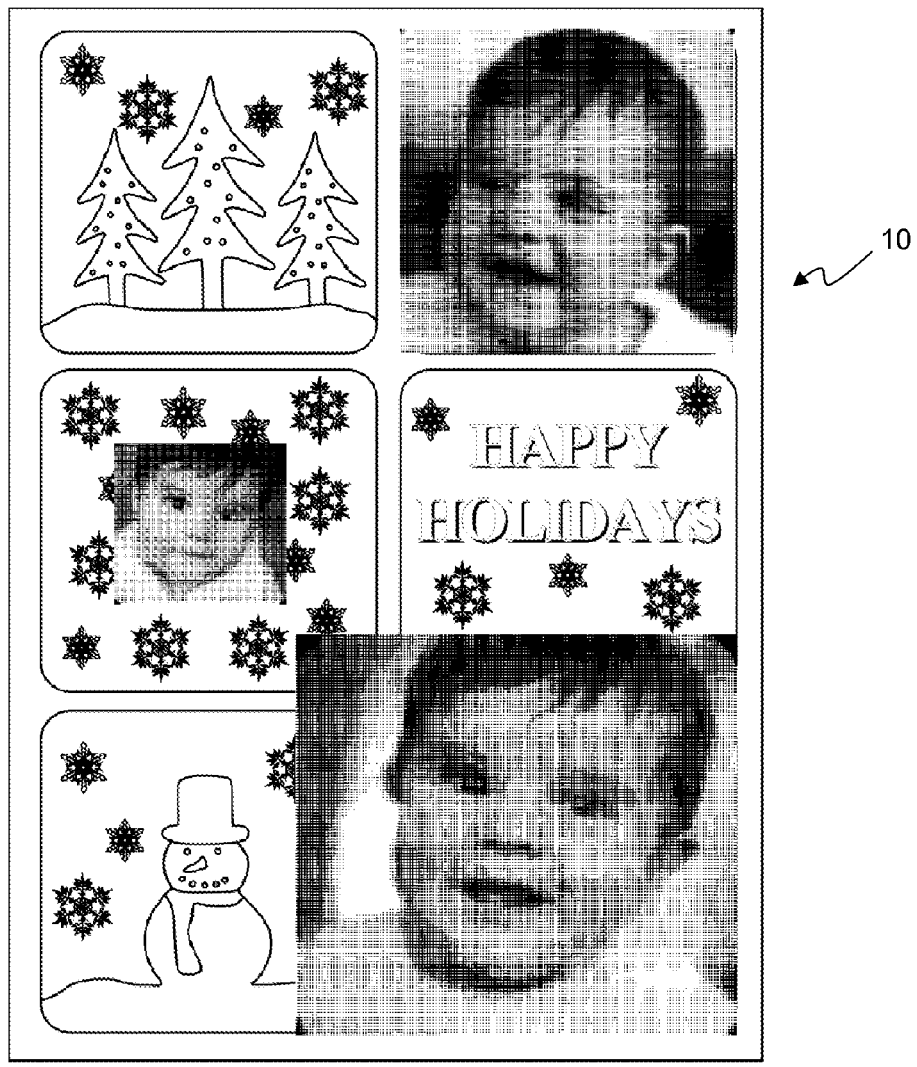
FIG. 6C illustrates an image template having two modified template openings and two composited digital images according to an embodiment of the present invention.

"In a further embodiment of the present invention, the modifications made to one template opening can affect the modifications made to a second template opening. For example, if one modified template opening is made larger, a second modified template opening is made smaller, for example, by proportionally decreasing a stored maximum size of the template opening. If a maximum template opening size is provided, it can be adjusted when an adjoining template location is modified. Thus, a first modified template opening for a first template opening is formed and a second modified template opening for a second template opening is formed. The maximum template opening size for the second modified template opening is dependent on the template opening size of the first modified template opening. As illustrated in FIGS. 6A and 6B, a template 10 having a smaller provided digital image composited into one template opening having maximum template opening size 9 provides room to enlarge and modify another template location 19 having maximum template opening size 8 so that the larger image of FIG. 6B can be composited into the enlarged modified template opening 19, as shown in FIG. 6C."

Figure 7B:
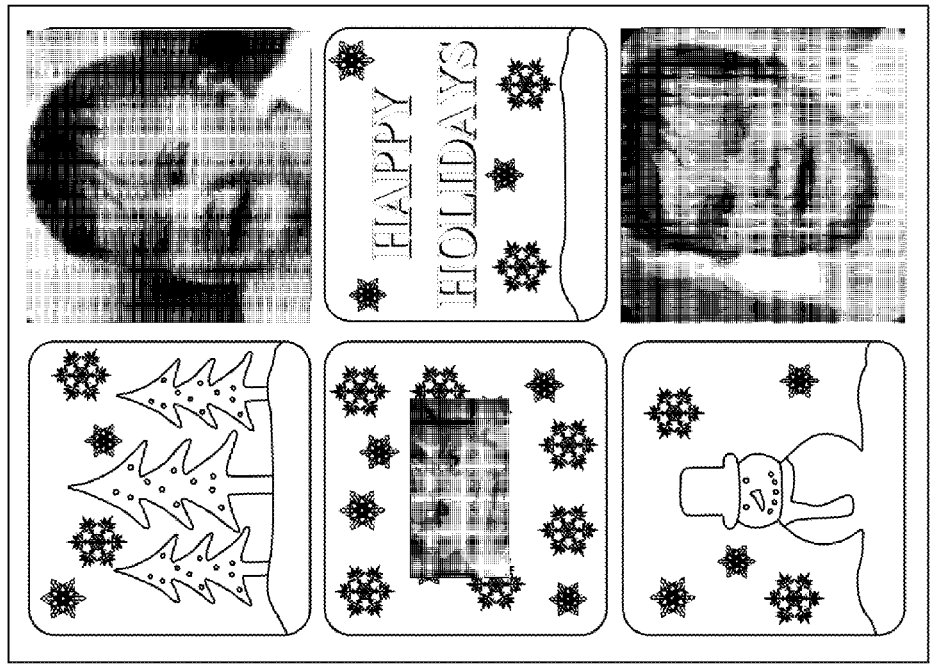
FIG. 7B illustrates an image template having a modified template opening with a different aspect ratio and a composited digital image according to an embodiment of the present invention.
Figure 7A:
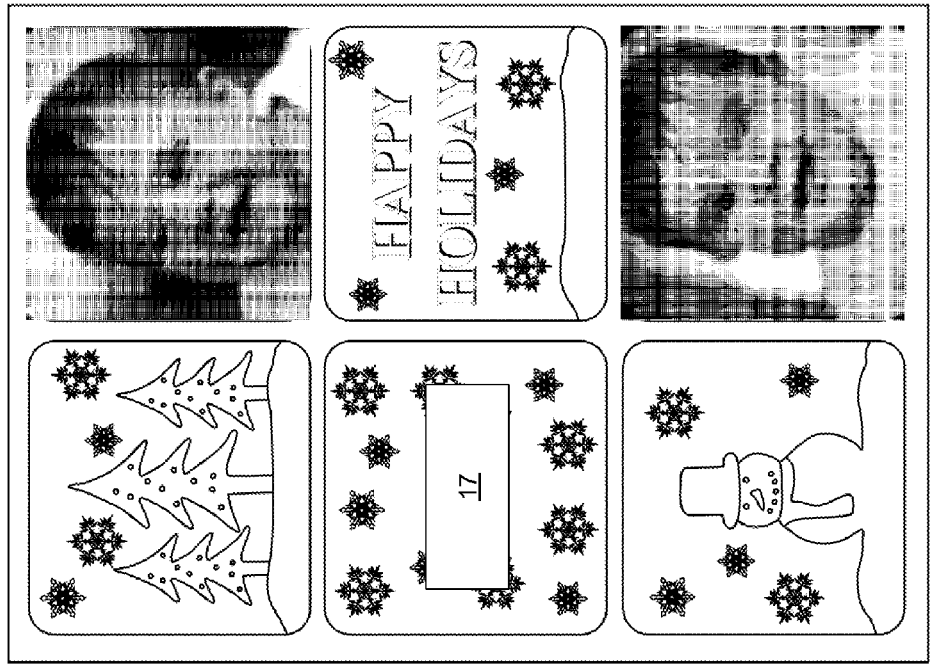
FIG. 7A illustrates an image template having a modified template opening with a different aspect ratio according to an embodiment of the present invention.

"Referring to FIG. 7A and according to an embodiment of the present invention, a template opening 17 in a template 10 is modified to have different aspect ratio designed to match the aspect ratio of a provided digital image. Referring to FIG. 7B, the provided digital image is shown composited into the modified template opening 17." Alternatively, FIG. 7B illustrates a provided image cropped to match a template opening selection.

Figure 8A:
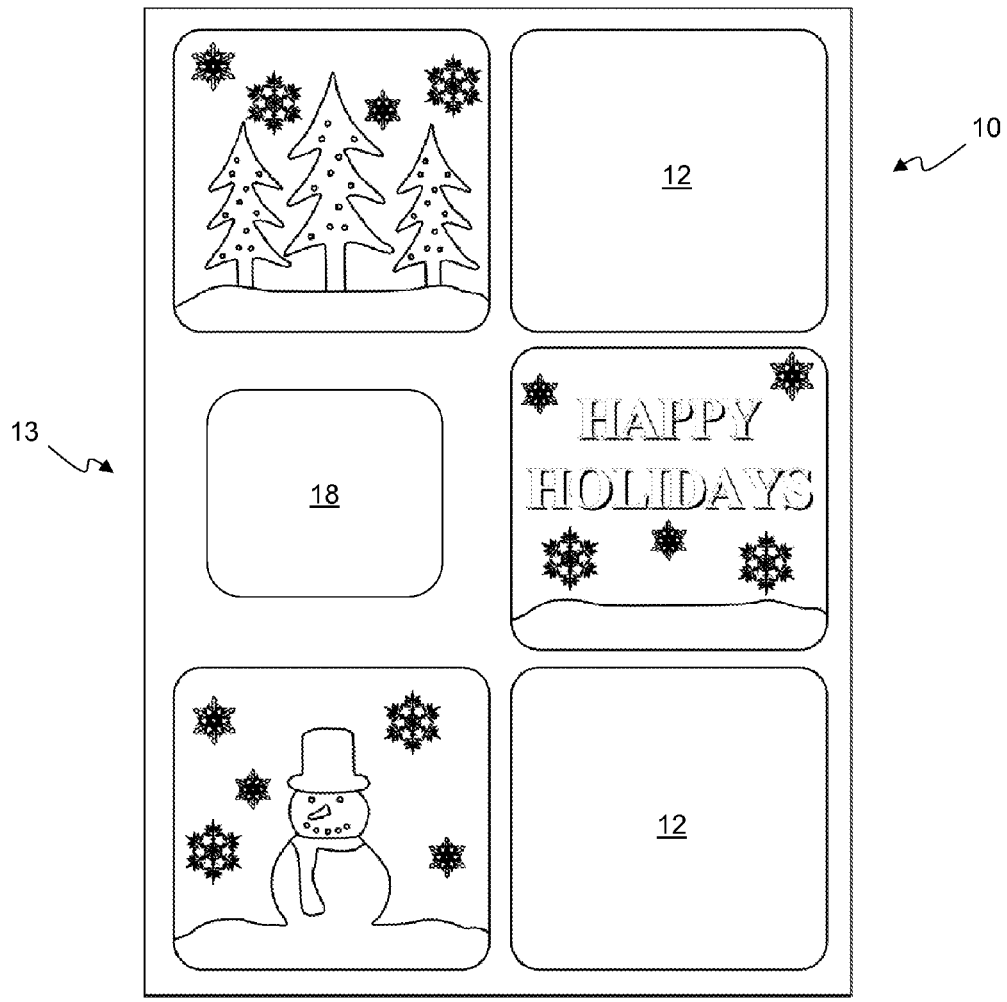
FIG. 8A illustrates an image template having a modified template opening and a black background area according to an embodiment of the present invention.
Figure 8B:
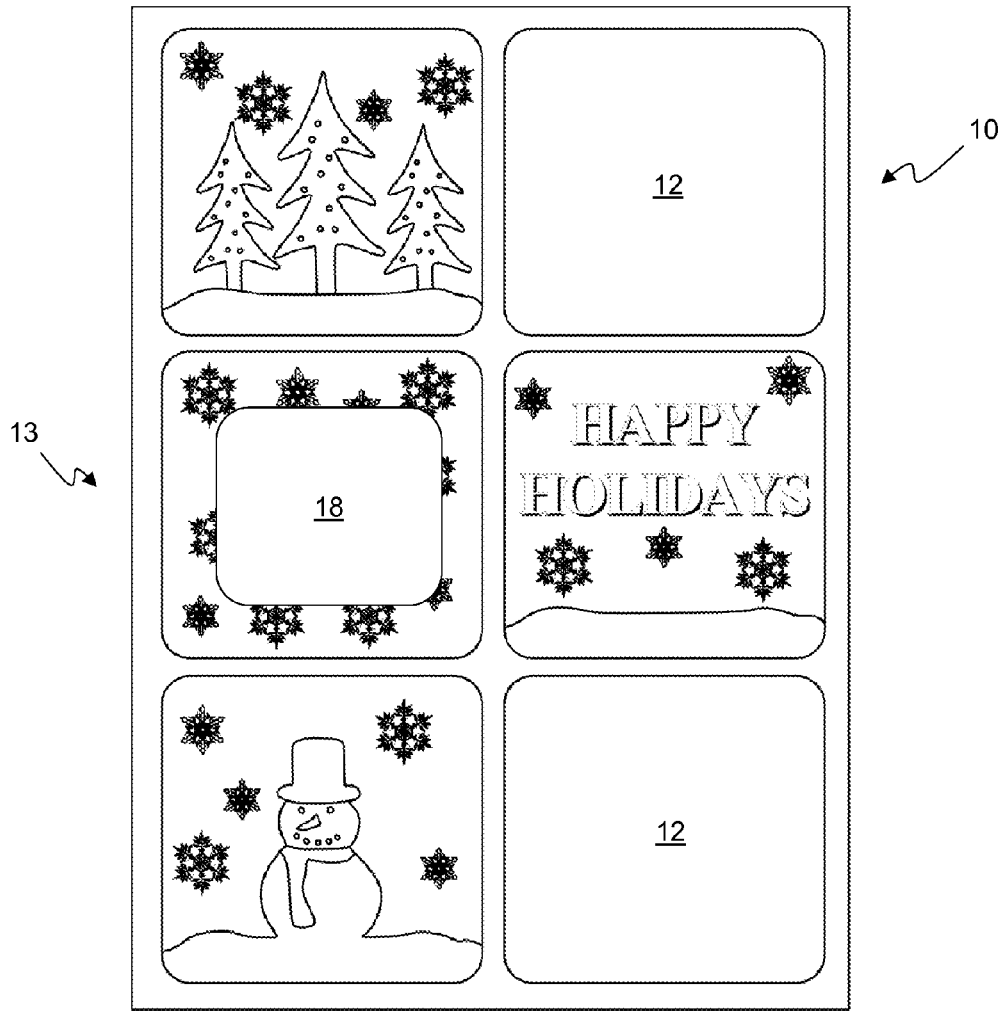
FIG. 8B illustrates an image template having a modified template opening and a background area including thematic elements according to an embodiment of the present invention.
Figure 8C:
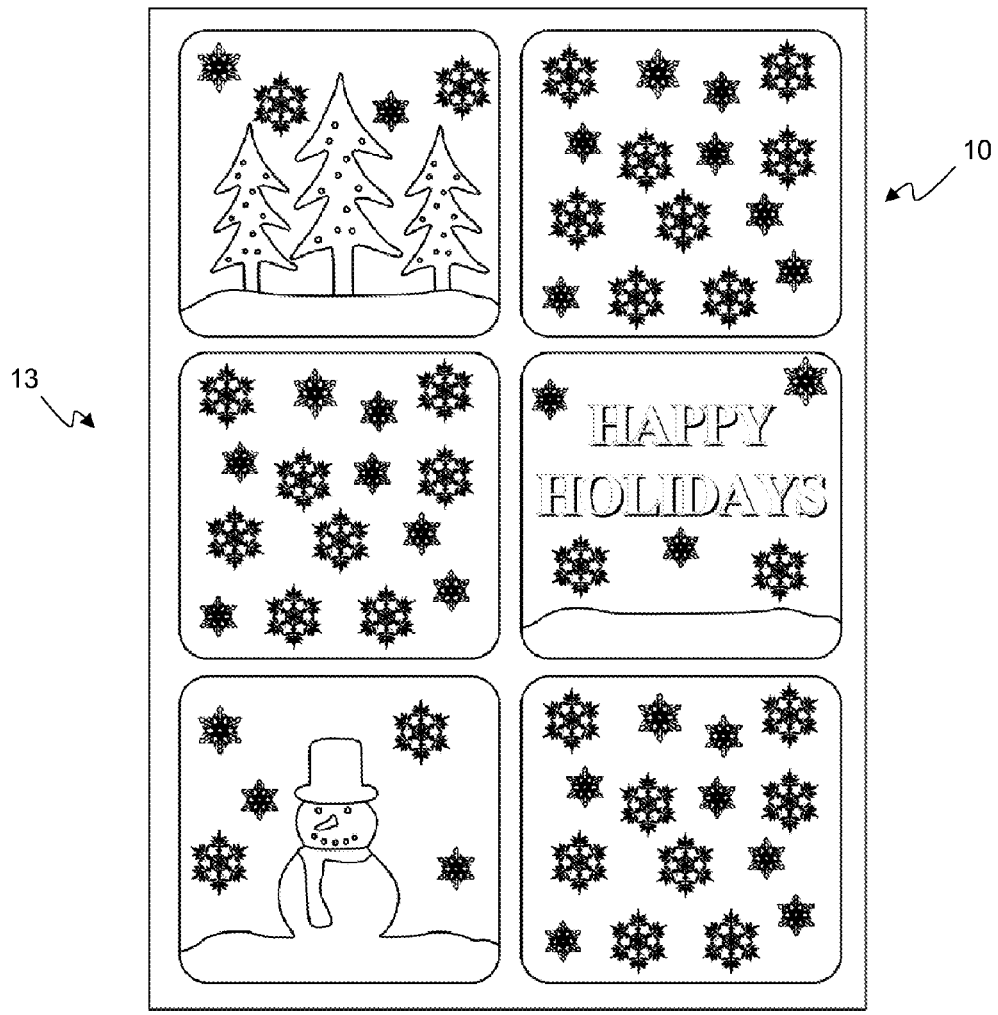
FIG. 8C illustrates an image template having background areas including thematic elements according to an embodiment of the present invention.
Figure 9:
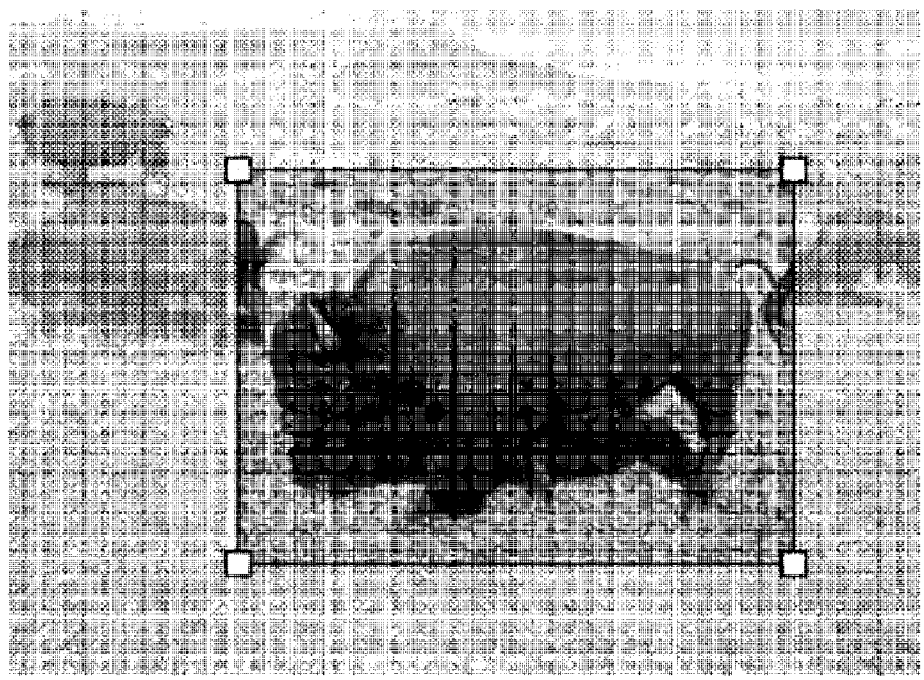
FIG. 9 is an illustration of cropping an image as is known in the prior art.

According to an embodiment of the present invention, a modified template opening can be smaller than the original template opening. In this case, the template opening can be designed, for example, as an overlay and additional background area around the modified template opening will be exposed to view. In order to fill the additional template background area, a template opening border can be increased in size to cover the additional background area. For example, a background color can fill in the additional template background area 13 as shown in FIG. 8A. In an alternative embodiment of the present invention and as illustrated in FIG. 8B, an area, pattern, or thematic element corresponding to the template area, pattern, or thematic element is employed in the additional template background area. In yet another alternative illustrated in FIG. 8C, the template itself includes an area, pattern, or thematic element in the template opening locations so that as the template openings are modified and reduced in size, the areas, patterns, or thematic elements are exposed without further processing. Hence, in this case, a template with template openings includes a background template design in the template openings.

"According to an embodiment of the present invention, a system useful for the present invention includes a graphic user interface for displaying digital images and digital image templates and a template with one or more template openings, each template opening having a template opening size and a template center point. The system includes circuitry, for example as part of a computer system with software, for receiving a digital image having an image size and calculating a desired maximum print or display size at a desired viewing distance for the digital image using the image size, receiving a template opening selection and comparing the maximum print or display size to the template opening size of the selected template opening. If the maximum print or display size is different than the template opening size of the selected template opening, the circuitry is operable to form a modified template opening centered at the template center point of the selected template opening, to composite the digital image into the modified template opening, and to communicate the composited template. A centerpoint 6 (FIG. 5) of an image, calculated by the computer system using an algorithm similar to the algorithm for calculating a centerpoint 14 (FIG. 2) of a template opening, can be used for alignment with a centerpoint 14 of the template opening. The system can also include printing, rendering, and communicating circuitry for printing, rendering, and communicating the template with the composited digital images."

Figure 11:
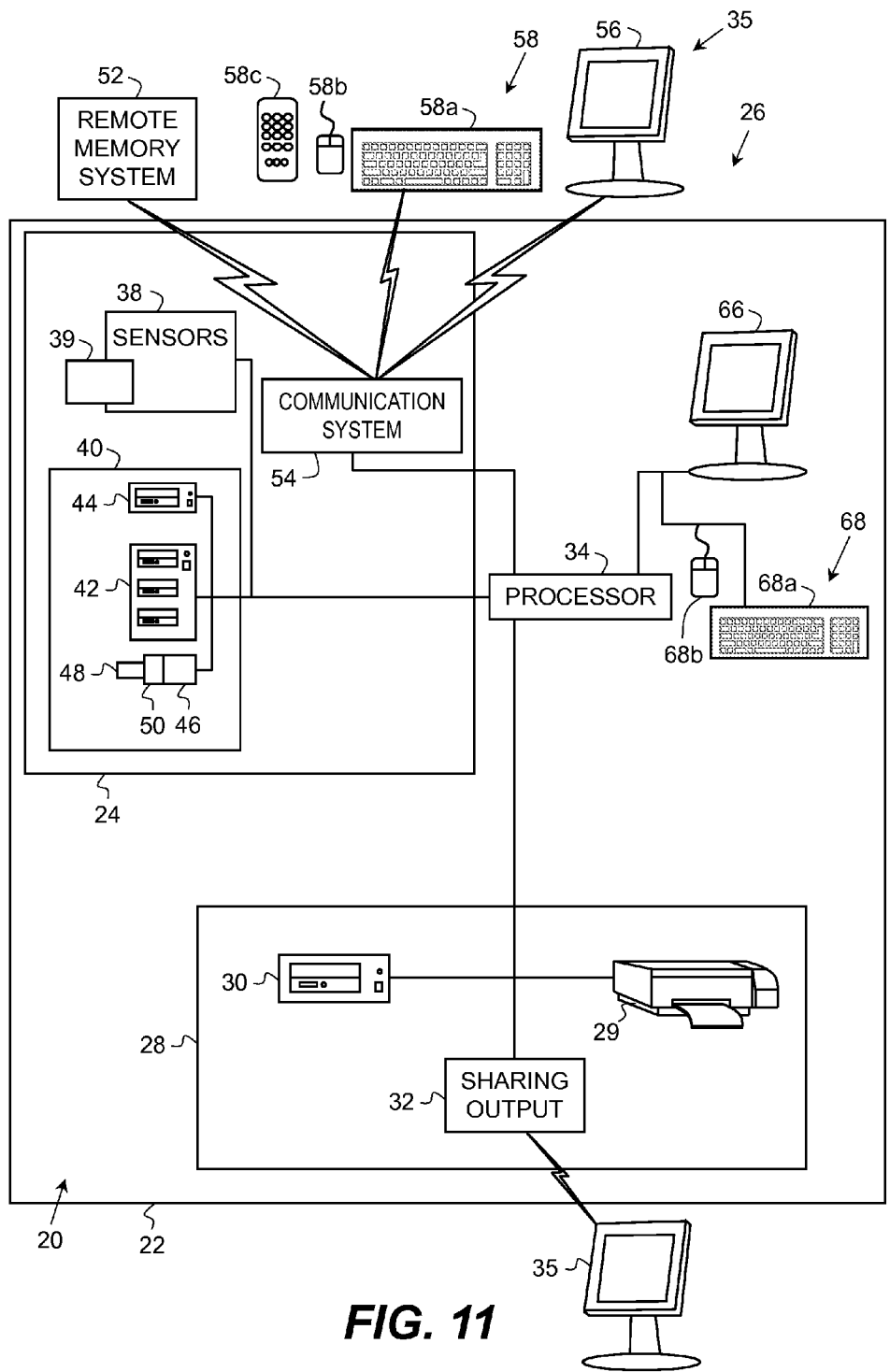
FIG. 11 is a computer system useful in an embodiment of the present invention.
Figure 12:
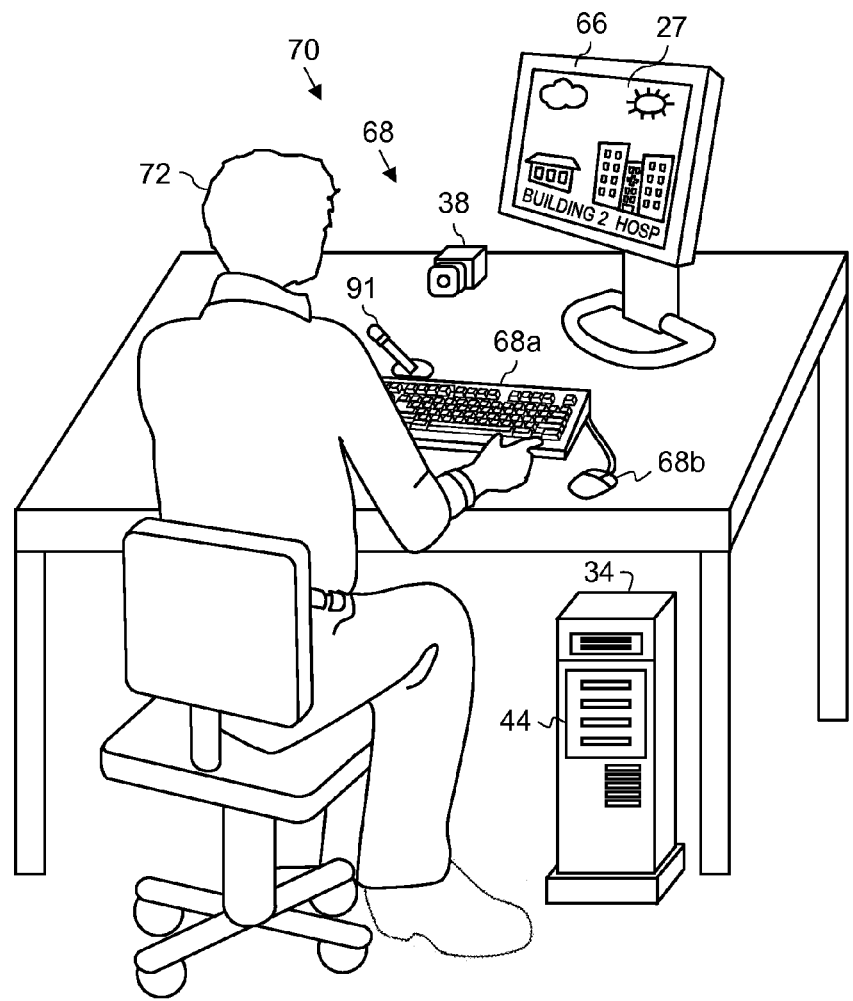
FIG. 12 is a computer system useful in an embodiment of the present invention.

Referring to FIGS. 11 and 12, computers, computer servers, and a communication system are illustrated together with various elements and components that are useful in accordance with various embodiment of the present invention. FIG. 11 illustrates a first embodiment of an electronic system 20 that can be used in generating an image product. In the embodiment of FIG. 11, electronic system 20 comprises a housing 22 and a source of content data files 24, a user input system 26 and an output system 28 connected to a processor 34. The source of content data files 24, user-input system 26 or output system 28 and processor 34 can be positioned within housing 22 as illustrated. In other embodiments, circuits and systems of the source of content data files 24, user input system 26 or output system 28 can be positioned in whole or in part outside of housing 22.

The source of content data files 24 can include any form of electronic or other circuit or system that can supply digital data to processor 34 from which processor 34 can derive images for use in forming an image-enhanced item. In this regard, the content data files can comprise, for example and without limitation, still images, image sequences, video graphics, and computer-generated images. Source of content data files 24 can optionally capture images to create content data for use in content data files by use of capture devices positioned at, or connected to, electronic system 20 and/or can obtain content data files that have been prepared by or using other devices. In the embodiment of FIG. 11, source of content data files 24 includes sensors 38, a memory 40 and a communication system 54.

Sensors 38 are optional and can include light sensors, biometric sensors and other sensors known in the art that can be used to detect conditions in the environment of system 20 and to convert this information into a form that can be used by processor 34 of system 20. Sensors 38 can also include one or more video sensors 39 that are adapted to capture still images or image sequences. Sensors 38 can also include biometric or other sensors for measuring involuntary physical and mental reactions such sensors including, but not limited to, voice inflection, body movement, eye movement, pupil dilation, body temperature, and p4000 wave sensors.

Memory 40 can include conventional memory devices including solid-state, magnetic, optical or other data-storage devices. Memory 40 can be fixed within system 20 or it can be removable. In the embodiment of FIG. 11, system 20 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including, but not limited to, control programs, digital images and metadata can also be stored in a remote memory system 52 such as a personal computer, computer network or other digital system. Remote memory system 52 can also include solid-state, magnetic, optical or other data-storage devices.

In the embodiment shown in FIG. 11, system 20 has a communication system 54 that in this embodiment can be used to communicate with an optional remote memory system 52, an optional remote display 56, and/or optional remote input 58. The optional remote memory system 52, optional remote display 56, optional remote input 58A can all be part of a remote system 21 having an input station 58 having remote input controls 58 (also referred to herein as "remote input 58"), can include a remote display 56, and that can communicate with communication system 54 wirelessly as illustrated or can communicate in a wired fashion. In an alternative embodiment, a local input station including either or both of a local display 66 and local input controls 68 (also referred to herein as "local user input 68") can be connected to communication system 54 using a wired or wireless connection.

Communication system 54 can comprise for example, one or more optical, radio frequency or other transducer circuits or other systems that convert image and other data into a form that can be conveyed to a remote device such as remote memory system 52 or remote display 56 using an optical signal, radio frequency signal or other form of signal. Communication system 54 can also be used to receive a digital image and other data from a host or server computer or network (not shown), a remote memory system 52 or a remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system. In one useful embodiment, the system 20 can provide web access services to remotely connected computer systems (e.g. remote systems 35) that access the system 20 through a web browser. Alternatively, remote system 35 can provide web services to system 20 depending on the configurations of the systems.

User input system 26 provides a way for a user of system 20 to provide instructions to processor 34. This allows such a user to make a designation of content data files to be used in generating an image-enhanced output product and to select an output form for the output product. User input system 26 can also be used for a variety of other purposes including, but not limited to, allowing a user to arrange, organize and edit content data files to be incorporated into the image-enhanced output product, to provide information about the user or audience, to provide annotation data such as voice and text data, to identify characters in the content data files, and to perform such other interactions with system 20 as will be described later.

In this regard user input system 26 can comprise any form of transducer or other device capable of receiving an input from a user and converting this input into a form that can be used by processor 34. For example, user input system 26 can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 11, user input system 26 includes an optional remote input 58 including a remote keyboard 58a, a remote mouse 58b, and a remote control 58c and a local input 68 including a local keyboard 68a and a local mouse 68b.

Remote input 58 can take a variety of forms, including, but not limited to, the remote keyboard 58a, remote mouse 58b or remote control handheld device 58c illustrated in FIG. 11. Similarly, local input 68 can take a variety of forms. In the embodiment of FIG. 11, local display 66 and local user input 68 are shown directly connected to processor 34.

As is illustrated in FIG. 12, local user input 68 can take the form of a home computer, an editing studio, or kiosk 70 (hereafter also referred to as an "editing area 70") that can also be a remote system 35 or system 20. In this illustration, a user 72 is seated before a console comprising local keyboard 68a and mouse 68b and a local display 66 which is capable, for example, of displaying multimedia content. As is also illustrated in FIG. 112 editing area 70 can also have sensors 38 including, but not limited to, video sensors 39, audio sensors 74 and other sensors such as multispectral sensors that can monitor user 72 during a production session.

Output system 28 is used for rendering images, text or other graphical representations in a manner that allows image-product designs to be combines with user items and converted into an image product. In this regard, output system 28 can comprise any conventional structure or system that is known for printing or recording images, including, but not limited to, printer 29. Printer 29 can record images on a tangible surface using a variety of known technologies including, but not limited to, conventional four-color offset separation printing or other contact printing, silk screening, dry electrophotography such as is used in the NexPress 2100 printer sold by Eastman Kodak Company, Rochester, N.Y., USA, thermal printing technology, drop-on-demand inkjet technology and continuous inkjet technology. For the purpose of the following discussions, printer 29 will be described as being of a type that generates color images. However, it will be appreciated that this is not necessary and that the claimed methods and apparatuses herein can be practiced with a printer 29 that prints monotone images such as black and white, grayscale, or sepia toned images. As will be readily understood by those skilled in the art, a system 35, 20 with which a user interacts to define a user-personalized image product can be separated from a remote system (e.g. 35, 20) connected to a printer, so that the specification of the image product is remote from its production.

In certain embodiments, the source of content data files 24, user input system 26 and output system 28 can share components.

Processor 34 operates system 20 based upon signals from user input system 26, sensors 38, memory 40 and communication system 54.

Processor 34 can include, but is not limited to, a programmable digital computer, a programmable microprocessor, a programmable logic processor, a series of electronic circuits, a series of electronic circuits reduced to the form of an integrated circuit, or a series of discrete components. The system 20 of FIGS. 11 and 12 can be employed to make and display an image product according to an embodiment of the present invention.

The present invention provides advantages over the prior art. Image products incorporating templates composited with digital images provided by users can adapt more readily to a wider variety of user-provided digital images and provide more aesthetic results. Furthermore, the process of making improved image products can be more readily automated, reducing the amount of work on the part of a user and increasing the efficiency of the manufacturing process.

The invention has been described in detail with particular reference to certain preferred embodiments thereof, but it will be understood that variations and modifications can be effected within the spirit and scope of the invention.

PARTS LIST 5 digital image
6 digital image center point
7 digital image size
8 maximum template opening size
9 maximum template opening size
10 template
12 template opening
13 template background area
14 template opening center point
16 template opening size
17 modified template opening with modified aspect ratio
18 modified template opening
19 enlarged modified template opening
20 system
22 housing
24 source of content data files
26 user input system
27 graphic user interface
28 output system
29 printer
34 processor
35 remote system
38 sensors
39 video sensor
40 memory
42 hard drive
44 disk drive
46 memory card slot
48 removable memory
50 memory interface
52 remote memory system
54 communication system
56 remote display
58 remote input
58a remote keyboard
58b remote mouse 58c remote control
66 local display
68 local input
68a local keyboard
68b local mouse
70 home computer, editing studio, or kiosk
72 user
74 audio sensors
100 provide GUI step
105 provide template step
110 receive images step
115 calculate maximum size step
120 receive template selection step
125 compare maximum size to template size step
130 decision step
135 form smaller modified opening step
137 form larger modified opening step
140 composite images step
145 communicate template step
150 email, print, or render step

The invention claimed is:

1. An automated method of making an image product, comprising the steps of:
   providing a GUI for displaying digital images and digital image templates on a display;
   providing a template having a template size and two or more template openings for display in the GUI, each template opening having a template opening size, a maximum template opening size, and a template opening center point;
   receiving a digital image having an image size;
   determining a viewing distance for the digital image, wherein the viewing distance is the distance from which the image product will be viewed;
   calculating a maximum print size or maximum display size, wherein calculating the maximum print size or maximum display size includes determining if the number of pixels per size in each dimension is below a threshold resolution, and wherein the threshold resolution is determined by the viewing distance and the image size;
   receiving a template opening selection associated with the received digital image, wherein the maximum template opening size of the selected template opening is smaller than the calculated maximum print size or maximum display size;
   using a processor to automatically compare the maximum print size or maximum display size to the template opening size of the template opening selection;
   if the maximum print size or maximum display size is different than the template opening size of the template opening selection, automatically forming a modified template opening centered at the template opening center point of the template opening selection and reducing the image size to provide an image size less than or equal to the maximum template opening size of the template opening selection;
   using the processor to automatically composite the digital image into the modified template opening; and
   communicating the composited template.

2. The method of claim 1, further including the step of forming a modified template opening larger than the template opening size of the template opening selection if the template opening size of the template opening selection is smaller than the maximum print size or maximum display size.

3. The method of claim 1, further including the step of forming a modified template opening smaller than the template opening size of the template opening selection and having a template opening size equal to the maximum print or display size if the template opening size of the template opening selection is larger than the maximum print size or maximum display size.

4. The method of claim 1, further including the step of providing a maximum template opening size for a template opening and restricting the template opening size of the modified template opening to a size smaller than or equal to the maximum template opening size.

5. The method of claim 4, further including the step of providing a pre-determined maximum template opening size for a template opening.

6. The method of claim 4, further including the steps of forming a first modified template opening for a first template opening and forming a second modified template opening for a second template opening and wherein the maximum template opening size for the second modified template opening is dependent on the template opening size of the first modified template opening.

7. The method of claim 1, further including the step of modifying the aspect ratio of the template opening.

8. The method of claim 1, further including the step of cropping the digital image to correspond to the template opening.

9. The method of claim 1, further including the step of providing two template openings having different sizes, different aspect ratios, or different orientations.

10. The method of claim 1, further including the step of forming the modified template opening to have an aspect ratio different from the aspect ratio of the template opening selection.

11. The method of claim 1, further including the step of providing a plurality of digital images.

12. The method of claim 1, further including the step of printing the template with a digital image composited into each template opening.

13. The method of claim 1, further including the step of mailing the template with a digital image composited into each template opening.

14. The method of claim 1, further including the step of rendering the composited template to an output device.

15. The method of claim 1, further including the step of increasing a template opening border or background area.

16. The method of claim 10, further including the step of providing template openings filled with a pattern or thematic element corresponding to the template area, pattern, or thematic element.

17. The method of claim 10, further including the step of replicating pattern or thematic element in the increased template opening border or background area.

18. The method of claim 1, further including the step of providing a template with template openings and a background template design in the template openings.

19. The method of claim 1, wherein the step of compositing includes calculating a center point of the digital image and selectively aligning the center point of the digital image with the template opening center point.

20. A computer system for making an image product, comprising:
   a display having a GUI for displaying digital images and digital image templates;
   a memory storing a template having a template size and two or more template openings for displaying in the GUI, each template opening having a template opening size, a maximum template opening size, and a template opening center point;

circuitry for:
receiving a digital image having an image size;
determining a viewing distance for the digital image, wherein the viewing distance is the distance from which the image product will be viewed;
calculating a maximum print size or maximum display size, wherein calculating the maximum print size or maximum display size includes determining if the number of pixels per size in each dimension is below a threshold resolution, and
wherein the threshold resolution is determined by the viewing distance and the image size;
receiving a selected template opening associated with the received digital image, wherein the maximum template opening size of the selected template opening is smaller than the calculated maximum print size or maximum display size;
using a processor to compare the maximum print size or maximum display size to the template opening size of the selected template opening and, if the maximum print size or maximum display size is different than the template opening size of the selected template opening, forming a modified template opening centered at the template center point of the selected template opening and reducing the image size to provide an image size less than or equal to the maximum template opening size of the template opening selection;
using the processor to composite the digital image into the modified template opening; and
communicating the composited template.

* * * * *